United States Patent
Ikeda et al.

[11] Patent Number: 5,887,616
[45] Date of Patent: Mar. 30, 1999

[54] LIQUID TANK

[75] Inventors: Kimihiko Ikeda, Shimada; Kazuyuki Sasaki, Susono; Ichiro Kataoka, Susono; Kunimitsu Aoki, Susono; Shozo Ashizawa; Shinji Narama, both of Shimada, all of Japan

[73] Assignee: Yazaki Corporation, Tokyo, Japan

[21] Appl. No.: 664,491

[22] Filed: Jun. 17, 1996

[30] Foreign Application Priority Data

Jun. 23, 1995 [JP] Japan ................................. 7-158022

[51] Int. Cl.⁶ ............................................. G01F 23/00
[52] U.S. Cl. ..................... 137/558; 73/290 R; 116/227
[58] Field of Search ....................... 137/558; 73/290 R; 116/227

[56] References Cited

U.S. PATENT DOCUMENTS

| | | | |
|---|---|---|---|
| 2,074,959 | 3/1937 | Guest | 73/290 R |
| 3,285,181 | 11/1966 | Howard | 137/558 X |
| 3,314,292 | 4/1967 | Schulte et al. | 73/290 R |
| 3,756,080 | 9/1973 | Pringle | 73/290 R |
| 3,851,661 | 12/1974 | Fernandez | 137/558 |
| 4,014,213 | 3/1977 | Parquet | 73/290 R |
| 4,798,224 | 1/1989 | Haws | 137/558 X |
| 5,088,323 | 2/1992 | Johnson et al. | 73/290 R |

FOREIGN PATENT DOCUMENTS

| | | | |
|---|---|---|---|
| 61-144431 | 9/1986 | Japan . | |
| 1768410 | 10/1992 | U.S.S.R. | 137/558 |

*Primary Examiner*—John Rivell
*Attorney, Agent, or Firm*—Oblon, Spivak, McClelland, Maier & Neustadt, P.C.

[57] ABSTRACT

A liquid tank includes a tank body forming a reservoir for gasoline G, a flexible partition film 1 arranged in the tank body 1 to divide a space in the tank body into two vertical spaces, a float positioned on the gasoline G, an arm 3 for converting a high and low position of the float 3 into a rotational position of the arm 5, and a potentiometer 5 for detecting a position of the flexible partition film. Since the gasoline G is covered with the partition film, the gasoline G does not vaporize into the air in the tank body an. Even if the gasoline surface is slanted to the tank body an by an acceleration of the vehicle, the flexible partition film serves to restrict the inclination of the surface. Therefore, it is possible to precisely a residual amounts of the gasoline G irrespective of the inclination.

22 Claims, 17 Drawing Sheets

LIQUID TANK

BACKGROUND OF THE INVENTION

1. Field of the Invention

The present invention relates to a liquid tank which is capable of detecting a liquid level of liquid, such as gasoline.

2. Discussion of the Background

As an example of such a liquid tank, there is known a fuel tank for reserving gasoline for vehicles. Generally, the fuel tank is provided with means for detecting a surface level of the gasoline. The level detecting means comprises a float on the gasoline, an arm for converting a high and low position of the float into a rotational position of the arm, and a potentiometer (sensor) for converting the rotational position of the arm into electric signals.

In the above-mentioned fuel tank, the surface of gasoline often inclines by the vehicle's acceleration, deceleration, rolling or the like. Further, by the vehicle's vibration, the surface of gasoline sometimes undulates and inclines and the gasoline scatters as the case may be.

Thus, it should be noted that in the above fuel tank, the level of gasoline is usually changeable. Therefore, if an output of the potentiometer is introduced into a not-shown fuel indicator directly, a pointer indicating the residual amounts is so changeable that it is hard for a driver to see. Accordingly, in order to obtain the mean value of the residual gasoline, there has been taken some measures that a responsibility of the fuel indicator is purposely decreased and that a resistance plate for resisting the motion of gasoline is arranged in the fuel tank.

In addition, because of its easiness for vaporization, a space on the upside of the tank is filled with the vaporized gasoline. Therefore, when the gasoline is charged into the fuel tank, the vaporized gasoline in the tank will be discharged in the air through a return pipe.

In order to solve the problem, there has been developed a fuel tank in which an expandable bag is arranged in a tank body, while the gasoline is supplied into the bag. In the fuel tank having the above bag, since the gasoline does not come in contact with the air, the gasoline is not vaporized and discharged in the air.

In the above fuel tank, however, an upper position of the bag changes greatly since the gasoline moves in the form of a packed bag. Accordingly, it is necessary to decrease the responsibility of the fuel indicator for purposes of obtaining an average of the residual amounts of the gasoline. Note, due to the bag, it is impossible to arrange the above resistance plate in the tank body.

Further, despite of the decrease in responsibility of the fuel indicator and the provision of the resistance plate, if the automobile is left on a slope as it is, the fuel surface will incline with time passing, so that the fuel indicator displays erroneous residual amounts just as calculated. Therefore, the conventional fuel tank has a problem of producing a great error in residual amounts of the gasoline, particularly, on the slanted load.

On the other hand, in the above-mentioned fuel tank having the bag therein, there is a problem that the bag is easy to be injured because the bag has a large surface area and moves while rubbing against the inner face of the tank body with an movement of the gasoline.

SUMMARY OF THE INVENTION

It is therefore an object of the present invention to provide a liquid tank which is capable of detecting residual amounts of liquid precisely and preventing the vaporization of liquid and which can exhibit superior durability.

The object of the present invention described above can be accomplished by a liquid tank comprising:

a tank body for reserving liquid;

a flexible partition film arranged in the tank body to divide a space therein into both up and down spaces and positioned so as to cover a surface of the liquid; and level detecting means for detecting a position of the flexible partition film.

With the arrangement mentioned above, since the liquid is covered with the partition film, the liquid does not vaporize into the air in the tank body. In case that the tank body inclines or the liquid surface is slanted to the tank body by an acceleration applied on the body, the flexible partition film serves to restrict the inclination of the liquid surface. Additionally, in even a case that waves are generated on the liquid surface by vibrations of the tank body, the film operates to restrict an occurrence of waves. Consequently, as an upper face of the partition film is stabilized, it is possible to detect the residual amounts of the liquid precisely by detecting a position of the upper face. Moreover, since the surface area of the partition film is not so large as covering the whole liquid in the tank body but small to cover the upper face of liquid, there is less possibility that the film is injured. Again, since the partition film does not move while rubbing against an inner face of the tank body, the film is not damaged by the inner face. Thus, the arrangement allows the durability of the partition film to be improved. In conclusion, it is possible to detect the residual amounts of liquid more precisely and prevent the vaporization of liquid, providing a liquid tank having a superior durability.

It is preferable that the level detecting means is adapted so as to detect a position of a portion of the flexible partition film, the portion being positioned corresponding to a center of the tank body in the horizontal direction. In this case, a position of the partition film detected by the level detecting means does not almost vary irrespective of inclinations of the partition film. Therefore, it is possible to detect the residual amounts of liquid precisely in the extreme.

Alternatively, the flexible partition film may be provided on a top face thereof with a supplementary plate in the form of a flat plate, while the level detecting means detects a position of a top face of the supplementary plate.

Then, since the supplementary plate serves to restrict the waves on the surface of the liquid perfectly, it allows to exclude measurement errors in residual amounts of the liquid, which originate in the occurrence of waves. Note that, in the liquid tank, a pair of upper and lower supplementary plates in the form of flat plates may be arranged so as to interpose the partition film therebetween, while the level detecting means may detect a position of the upper supplementary plate. In this case, by connecting the upper and lower supplementary plates to each other by fasteners etc., it is possible to fix the plates on the film securely. In the present invention, preferably, the flexible partition film is made of material having an elastic force to urge the supplementary plate against a surface of the liquid. With this arrangement, owing to the elastic force, it is possible to suppress the liquid surface's inclination at the time of accelerating and parking on the slope, whereby the precise detection for the residual amounts can be attained.

In the present invention, more preferably, the level detecting means is adapted so as to detect a position of a portion of the supplementary plate, the portion being positioned corresponding to a center of the tank body in the horizontal direction. In such a case, even if the upper face of the supplementary plate inclines, there is not produced any change in position of the supplementary plate detected by the level detecting means. Accordingly, it allows the residual amounts to be detected precisely to the extreme. It is also preferable that the liquid tank further includes a linking mechanism for holding the supplementary plate so that a center portion of the supplementary plate is adjusted to the center of the tank body in the horizontal direction, while carrying the supplementary plate so as to move up and down. Owing to this linking mechanism, when the supplementary plate is slanted, it is possible to prevent the plate from shifting in the horizontal direction. If the supplementary plate moves horizontally, the position of the plate in the up and down directions, which is detected by the level detecting means, will be further deviated (see FIG. 11). Therefore, it allows the residual amounts to be detected more precisely.

In the above-mentioned arrangement, preferably, the linking mechanism includes a linking member, while the level detecting means comprises a sensor for detecting a pivot angle of the link member of the linking mechanism. In this case, it is possible to make use of the linking mechanism as a constituent of the level detecting means advantageously. Preferably, the flexible partition film comprises a textile material made by fabrics and a sealing member fitted on at least one of both surfaces of the textile material to exhibit sealability and flexibility. In the case, since the tensile strength of the partition film can be improved by the textile material, it is possible to adopt the sealing member exhibiting high sealability, flexibility and high corrosion resistance against the liquid, in spite of its inferior strength. Therefore, the fuel tank can be provided to have the partition film exhibiting superior characteristics in terms of its strength, the sealability, the flexibility and the corrosion resistance.

Alternatively, the flexible partition film may comprise a textile material made by fabrics and a sealing member fitted on at least one of both surfaces of the textile material to exhibit sealability and flexibility, while the supplementary plate may be constituted by a thickened part of the sealing member. In this case, when the sealing member is formed integral with the textile material, the supplementary plate can be also formed simultaneously. That is, it is possible to delete a process of manufacturing the supplementary plate independently and a process of assembling it to the partition film, so that a reduction of the manufacturing cost can be realized.

Again, alternatively, the flexible partition film may comprise a textile material made by fabrics and a sealing member fitted on at least one of both surfaces of the textile material to exhibit sealability and flexibility, while the supplementary plate may be constituted by a flat part of the flexible partition film where a flat plate is embedded in the sealing member. In this case, when the sealing member is formed integral with the textile material, for example, by the insert-molding, the supplementary plate can be also formed simultaneously. Accordingly, since a process of assembling the supplementary plate to the partition film can be eliminated, it is possible to reduce the manufacturing cost.

According to the present invention, there is also provided a liquid tank comprising:
- a tank body for reserving liquid;
- a supplementary plate arranged in the tank body so as to be in tight contact with a surface of the liquid;
- a flexible partition film arranged in the tank body so as to cover the remaining surface of the liquid spreading between a periphery of the supplementary plate and an inner wall of the tank body; and level detecting means for detecting a position of an upper face of the supplementary plate. In this case, since an area of the partition film is saved, a possibility of injuring the film can be decreased to improve the durability.

DESCRIPTION OF THE PREFERRED EMBODIMENT

Figure 1:
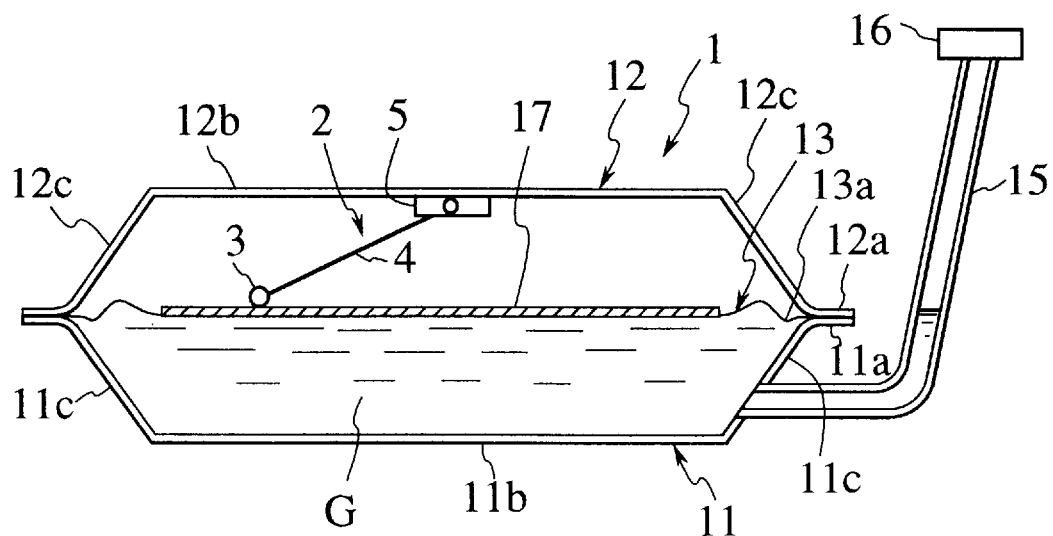
FIG. 1 is a cross sectional view of the fuel tank in accordance with a first embodiment of the present invention.

Embodiments of the present invention will be described with reference to drawings. Note, throughout the embodiments, elements in common with the embodiments are indicated by the same reference numerals, respectively.

FIGS. 1 to 11 show the first embodiment of the invention. In FIG. 1, reference numeral 1 designates a tank body which is composed of a lower vessel 11 and an upper vessel 12, while reference numeral 2 denotes level detecting means which comprises a float 3 on the gasoline G, an arm 4 for converting a high and low position of the float 3 into a rotational position of the arm 4, and a potentiometer 5 for converting the rotational position of the arm 4 into electric signals.

The lower vessel 11 and the upper vessel 12 are provided with flanges 11a and 12a bent outwardly, respectively. Through not-shown bolts, the flanges 11a, 12a are connected to each other, providing the tank body 1. The upper and lower vessels 11, 12 have a bottom face 11b and a top face 12b both of which are rectangular shaped of substantially identical size, respectively. The lower vessel 11 is composed of the bottom face 11b and four side faces 11c to constitute a trapezoidal container, while the upper vessel 12 is composed of the bottom face 12b and four side faces 12c to constitute another trapezoidal container having a shape and size identical to the lower vessel 11. Consequently, the tank body 1 is shaped to have a hexagonal cross section.

Arranged between the respective flanges 11a and 12a is a partition film 13 of which peripheral part 13a is interposed and fixed between the flanges 11a, 12a. That is, the peripheral part 13a is interposed between the flanges 11a, 12a about the whole circumference of the partition film 13 and fixed by tightening forces of the not-shown bolts connecting the flanges 11a, 12a to each other.

The partition film 13 is constituted by a textile member R1 (FIG. 4) made of nylon fiber, tetron fiber or the like and interposed between polymer materials R2 exhibiting elasticity and superior oil resistance, such as NBR rubber. Therefore, the partition film 13 has a high quality in flexibility and strength. In addition, the film 13 exhibits not only superior liquid-tight and airtight properties but superior oil resistance, corrosion resistance and durability against gasoline G and so on. Thus, owing to the superior flexibility, the partition film 13 can cover a surface of the gasoline G at all times while keeping in contact with it.

Figure 4:
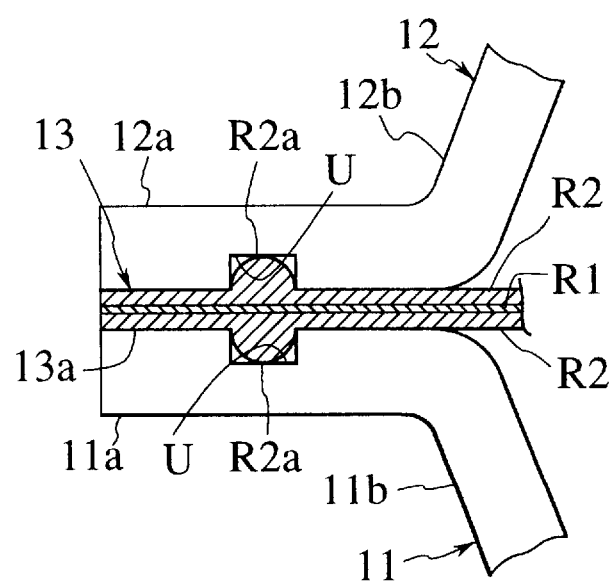
FIG. 4 is a cross sectional view of flanges of the fuel tank of FIG. 1.
Figure 5:
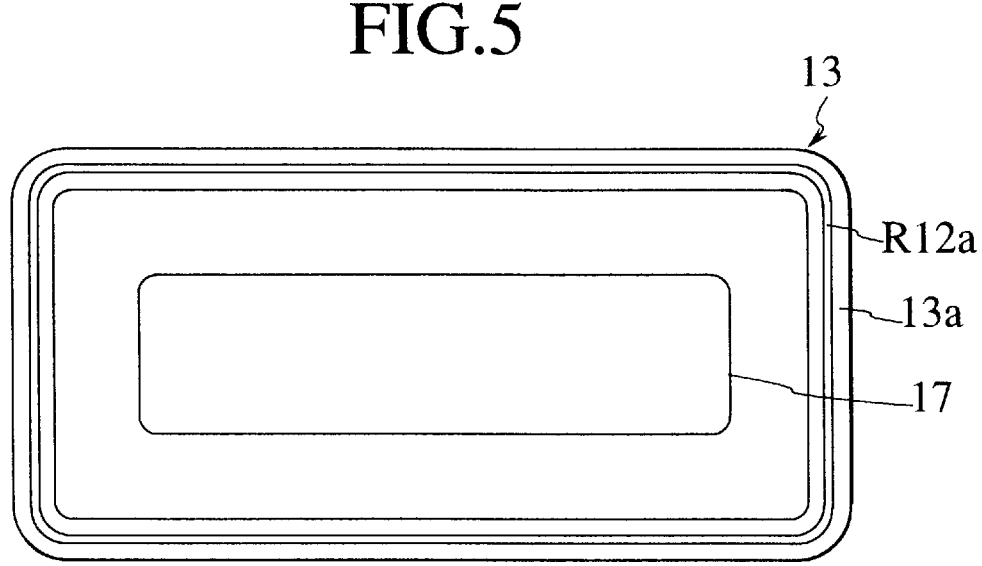
FIG. 5 is a plan view of a partition film of the fuel tank of FIG. 1.

As shown in FIGS. 4 and 5, the partition film 13 is provided on the peripheral part 13a with upper and lower beads R2a, R2a having arc cross sections of the polymer materials R2. While, the flanges 11a and 12a have grooves U formed on opposing faces to holding the beads R2a, R2a in a liquid-tight and airtight manner. In addition, the partition film 13 is formed so as to fit respective inner walls of the lower and upper vessels 11, 12, substantially. The peripheral part 13a is shaped in form of flange so as to be interposed between the flanges 11a and 12a.

Fixed on a top face of the partition film 13 at the center thereof is a supplementary plate 17 which has enough rigidity to maintain a level surface of the gasoline G irrespective of its variations and which has a weight so as not to sink under the gasoline G while closing to the specific gravity of the gasoline G. That is, while oppressing the surface of the gasoline G, the supplementary plate 17 serves to prevent an occurrence of variations on the surface, such as waves. The supplementary plate 17 is formed to be somewhat smaller than the bottom faces 11b and 12b.

Return to FIG. 1, reference numeral 15 denotes a pipe for charging the gasoline G and 16 a cap for to closing an inlet of the pipe 15.

Figure 2:
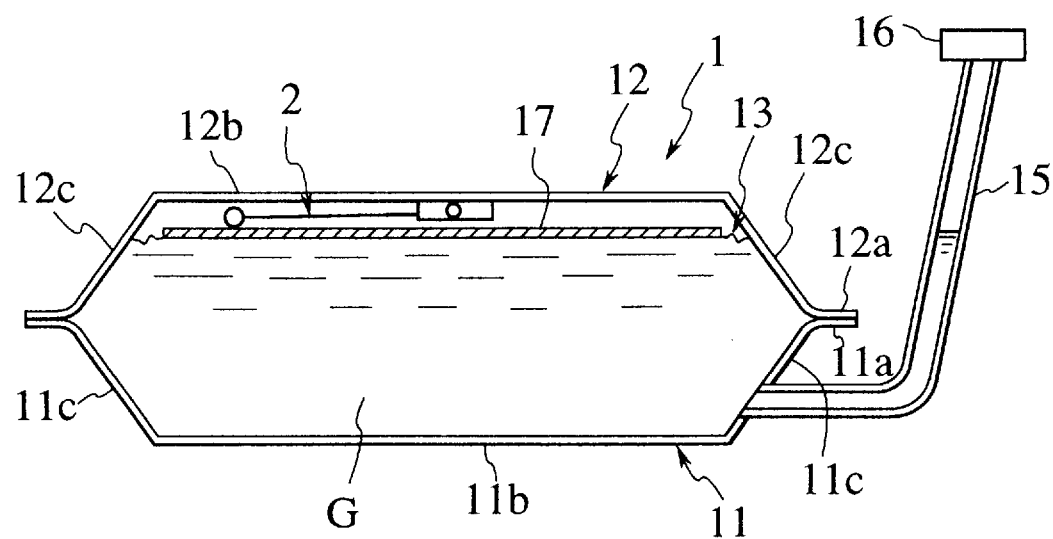
FIG. 2 is a cross sectional view of the fuel tank of FIG. 1, showing the operation.
Figure 3:
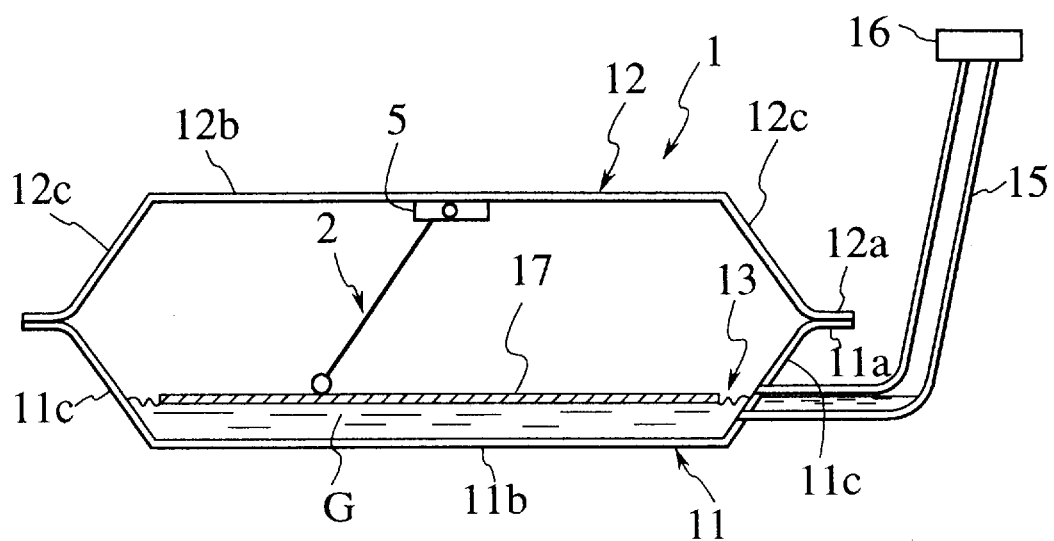
FIG. 3 is a cross sectional view of the fuel tank of FIG. 1, showing the operation.

In a fuel tank constructed as above, when the tank body 1 is charged with a half amount of gasoline G as shown in FIG. 1, the partition film 13 bends to the greatest extent. Then, if the gasoline G is further supplied, the filling-up condition of the fuel tank can be realized as shown in FIG. 2. Even such a condition, the partition film 13 is not expanded perfectly so as to cover the gasoline G while slackening. Conversely, when the tank is close to its empty condition of the gasoline G, the supplementary plate 17 is lowered as shown in FIG. 3. Then, when the gasoline G is further consumed, the supplementary plate 17 is brought into tight contact with the bottom face 11b of the lower vessel 11 finally. However, in even such a condition, the partition film 13 is not expanded perfectly, so there remains a room for its full-expansion.

Thus, the gasoline G supplied through the pipe 15 has always an upper vaporizing in the tank body 1. Simultaneously, residual amounts surface covered with the partition film 13 without contact with air in the tank body 1. Consequently, it is possible to prevent the gasoline G from being measured usually since the level detecting means 2 detects a position of the upper face of the supplementary plate 17.

Figure 6:
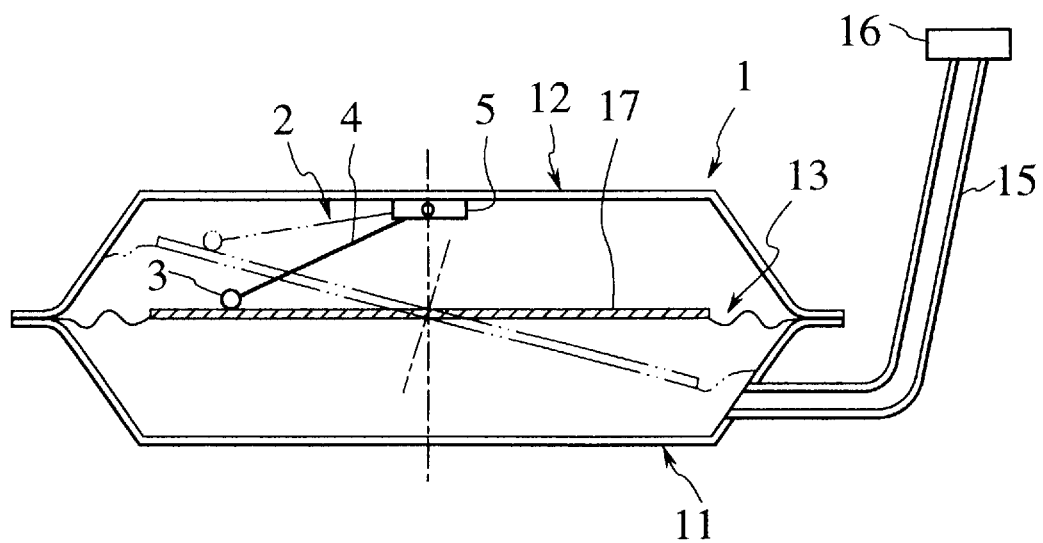
FIG. 6 is a cross sectional view of the fuel tank of FIG. 1, showing the operation.

On the other hand, in case that a vehicle is parked in a slope or that the vehicle is accelerated, the supplementary plate 17 inclines following to the top surface of the gasoline G as shown in FIG. 6. Then, according to the embodiment, both of the partition film 13 and the supplementary plate 17 serve to restrict inclination of the top face of the gasoline G. Therefore, in comparison with the case without the partition film 13 and the supplementary plate 17, it is possible to reduce the inclination of the top surface of the gasoline G, whereby the error of residual amounts of the gasoline G can be decreased.

Further, even if there is produced a force causing choppy waves on the gasoline G by vibrations etc., the partition film 13 and the supplementary plate 17 operate to oppress the top face of the gasoline G, so that it is possible to prevent the occurrence of waves on the surface of the gasoline G. That is, an error due to waves in residual amounts of gasoline can be prevented.

According to the embodiment, since the surface area of the partition film 13 is smaller than that of the conventional film in the form of a bag, the probability is small that the partition film 13 will be damaged. Moreover, as the partition wall 13 does not move while rubbing against the inner face of the tank body 1 any more, the possibility that the partition film 13 is damaged can be reduced remarkably.

Therefore, it is possible not only to detect the residual amounts of the gasoline G precisely but to prevent the vaporization. In addition, the fuel tank having considerable endurance can be provided.

Although it has been known empirically that the conventional fuel tank in operation shows a tendency that the level is lowered at the center of the liquid surface by right, left, back and forth accelerations at the vehicle's driving, the supplementary plate 17 also serves to restrict such a lowering in the level of the gasoline G.

Figure 7:
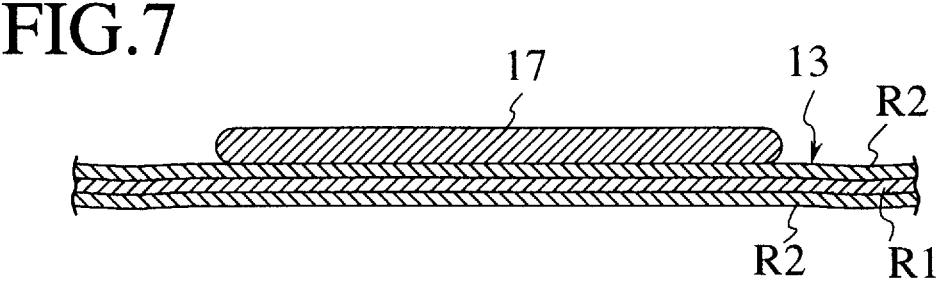
FIG. 7 is a cross sectional view of an essential part of the fuel tank, showing an example of the partition film and a supplementary plate.

Note, the above-mentioned supplementary plate 17 of the first embodiment is secured on the partition film 13 by means of adhesive agent, as shown in FIG. 7. Regarding the fixing form of the supplementary plate 17 on the film 13, it is preferable to round the periphery of the plate 17 in order to prevent the film 13 from being injured.

Figure 8:
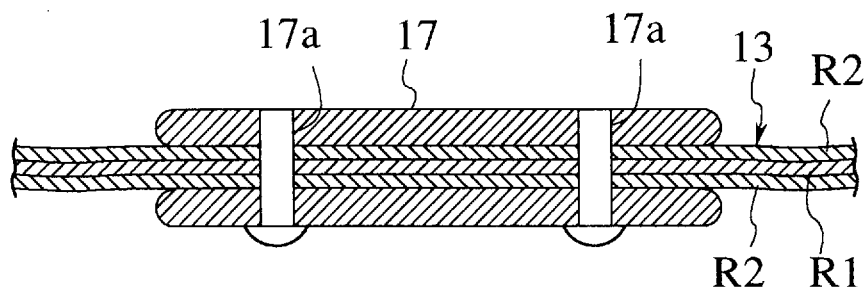
FIG. 8 is a cross sectional view of the essential part of the fuel tank, showing another example of the partition film and the supplementary plate.

In modifications, the above-mentioned supplementary plate 17 may be constituted by a pair of flat plates putting the partition film 13 therebetween, as shown in FIG. 8. In this case, by making use of tacks 17a as fastening means for the upper and lower plates 17, 17, it is also possible to fix the plates 17, 17 to the partition film 13 certainly.

Figure 9:
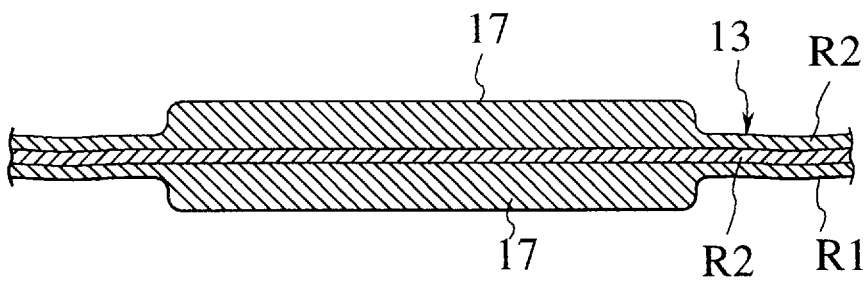
FIG. 9 is a cross sectional view of the essential part of the fuel tank, showing a further example of the partition film and the supplementary plate.

Alternatively, as shown in FIG. 9, the supplementary plate 17 may be replaced with a thickened part of the polymer material (sealing member) R2. For example, when rubber material corresponding to NBR is employed as the sealing member R2, an increase the thickness allows for provision of the supplementary plate 17 which shows a sufficient rigidity and which is capable of oppressing the surface of the gasoline G with a great force. In such a case, it is possible to form the supplementary plate 17 at the same time of integrating the sealing member R2 with the textile member R1. Therefore, the simultaneous forming allows the number of processes for manufacturing the plate 17 and assembling it to the partition film 13 to be decreased, so that the manufacturing cost can be saved.

Figure 10:
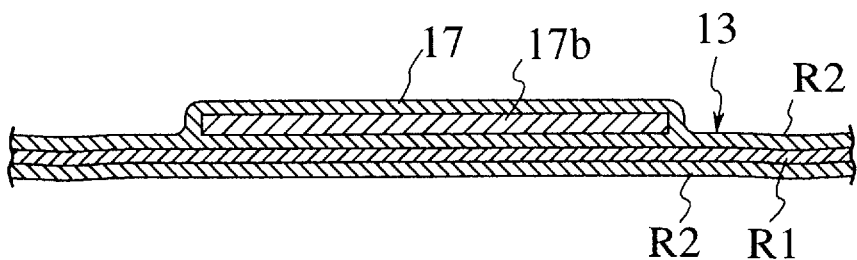
FIG. 10 is a cross sectional view of the essential part of the fuel tank, further showing an example of the partition film and the supplementary plate.

Again, as shown in FIG. 10, the supplementary plate 17 may be composed of a part of partition film 13 where a flat plate 17b is embedded in the sealing member R2. Thus, since the flat plate 17a is embedded in the sealing member R2, part of the partition film 13 can be changed into the supplementary plate 17 having sufficient rigidity. In this case, by the insert molding as an example, it is possible to form the supplementary plate 17 at the same time of integrating the sealing member R2 with the textile member R1. Therefore, since the process to assembling the plate 17 into the partition film 13 can be deleted, it is possible to reduce the manufacturing cost.

Figure 11:
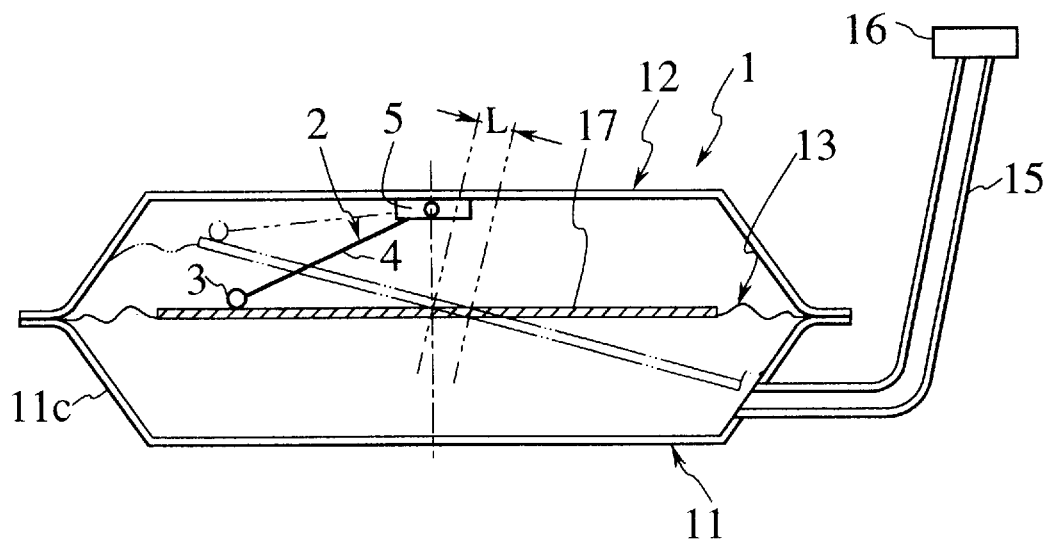
FIG. 11 is a cross sectional view of the fuel tank of FIG. 1, showing the operation.

Note, as shown in FIG. 11, there is a case that when the supplementary plate 16 inclines, it is shifted in the vertical direction by a distance of L together with the partition film 13. In such a case, the fuel tank will have a drawback of increasing the residual error of the gasoline G. The second and third embodiments are provided in order to solve the above drawback.

The second embodiment of the invention will be described with reference to FIGS. 12 to 16. Note, in this embodiment, elements similar to those in the first embodiment of FIGS. 1 to 11 are indicated by the same reference numerals, respectively, and their explanations will be simplified. A difference between the second embodiment and the first embodiment resides in that a center part of the supplementary plate 17 is supported by a linking mechanism 30.

Figure 12:
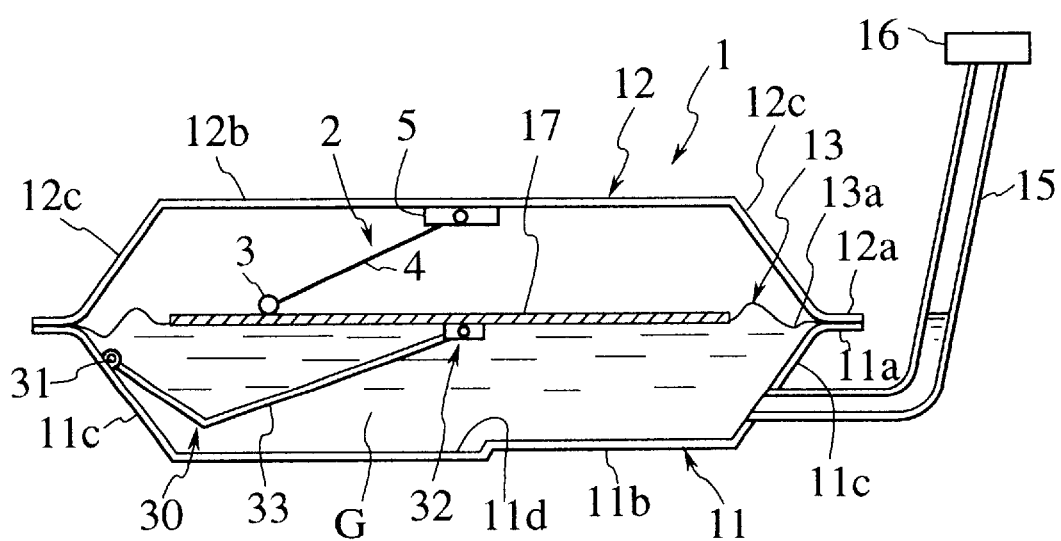
FIG. 12 is a cross sectional view of the fuel tank in accordance with a second embodiment of the present invention.
Figure 13:
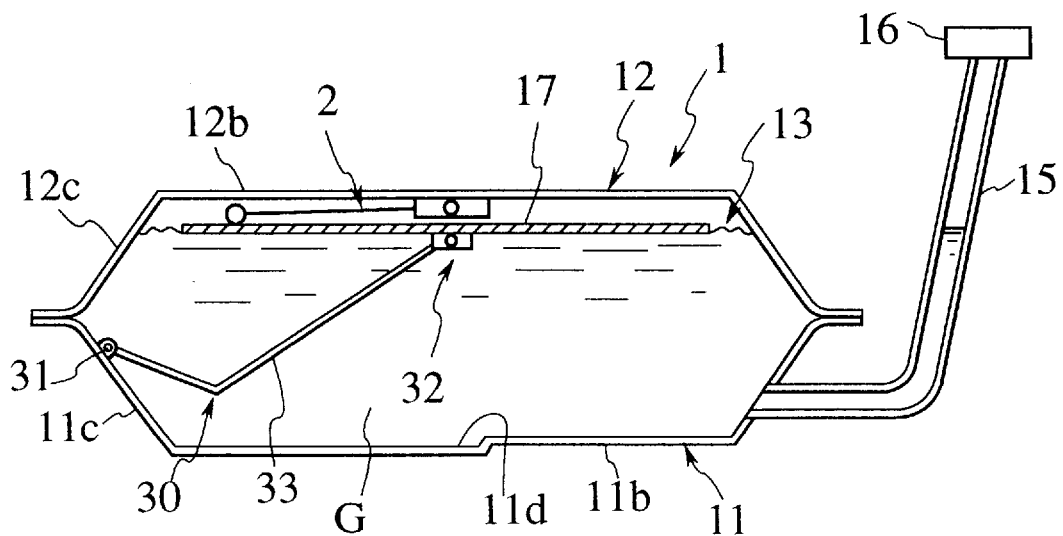
FIG. 13 is a cross sectional view of the fuel tank of FIG. 12, showing the operation.
Figure 14:
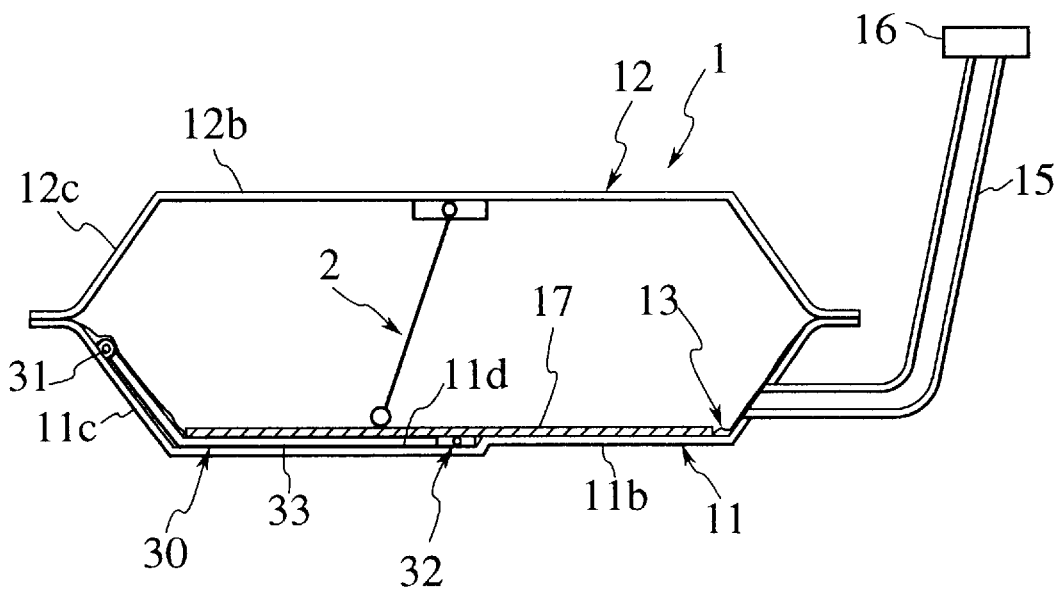
FIG. 14 is a cross sectional view of the fuel tank of FIG. 12, showing the operation.

As shown in FIGS. 12 to 14, the linking mechanism 30 includes a pivot 31 arranged on the inner wall of the lower vessel 11, a sliding pivot 32 arranged on an under face of the supplementary plate 32 and a linking member 33 having one end connected to the pivot 31 and the other end connected to the sliding pivot 32. The linking mechanism 30 serves to maintain a position of the supplementary plate 17 so as to adjust a center portion of the supplementary plate 17 to a center of the tank body 1 in the horizontal direction and to carry the supplementary plate 17 so as to move up and down.

Figure 15:
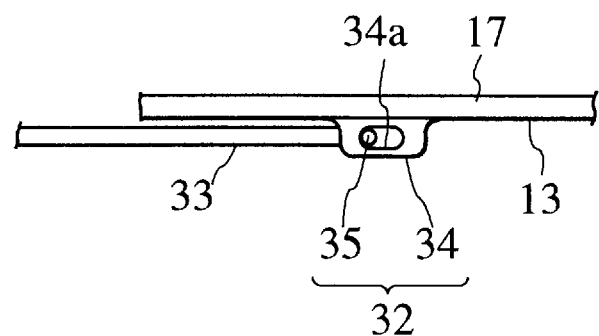
FIG. 15 is a side view of an essential part of a linking mechanism of the fuel tank of FIG. 12.
Figure 16:
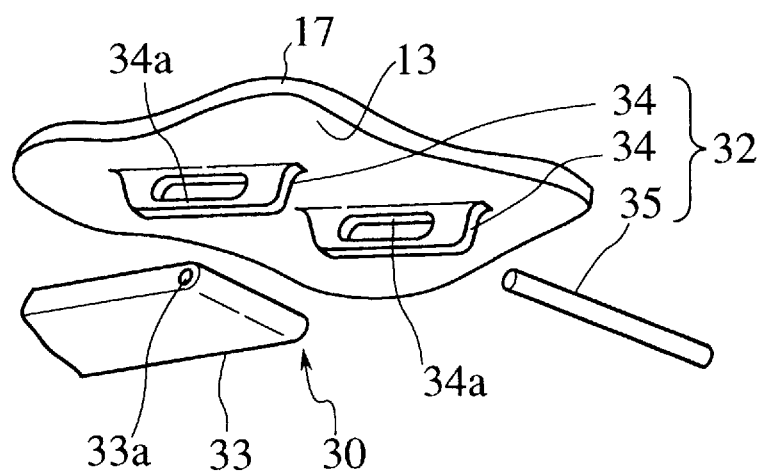
FIG. 16 is a perspective view of the essential part of the linking mechanism.

In FIGS. 15 and 16, the sliding pivot 32 includes brackets 34 projecting from the lower face of the supplementary plate 17 through the partition film 13, and a pin 35 for pivotably carrying the other end of the linking member 33. The parallel brackets 34 are arranged so as to interpose the other end of the linking member 33 therebetween, provided with elongated holes 34a for carrying the pin 35 so as to rotate and slide therein. The pin 35 is inserted into a through hole 33a formed on the other end of the linking member 33.

As shown in FIG. 14, the linking member 33 has a substantial L-shaped cross section so that when the supplementary plate 17 reaches the lowermost level, the member 33 follows to the side face 11c and the bottom face 11b of the lower vessel 11. While, a recess lid is formed on the bottom face 11b to accommodate the linking member 33 therein.

With the fuel tank constructed above, corresponding to the up and down movements of the supplementary plate 17, the linking member 33 rotates about the pivot 31 as a fulcrum, as shown in FIGS. 12 to 14 During such rotation, since the other end of the linking member 33 moves horizontally with respect to the tank body 1, the pin 35 of FIG. 15 moves along the elongated holes 34a. However, because of small in pivot angle of the linking member 33, the other end of the member 33 moves in the upward and downward directions while running along a center line of the tank body 1 in the horizontal direction, substantially. In addition, a length of each elongated hole 34 is remarkably short.

Thus, while being maintained at the center in the tank body 1 in the horizontal direction by the above-mentioned linking mechanism 30, the supplementary plate 17 moves up and down. Therefore, since the plate 17 does not move in the horizontal direction as shown in FIG. 11, it is possible to prevent an increase in the error of the residual amounts of the gasoline G.

The third embodiment of the invention will be described with reference to FIGS. 17 to 19. Note, in this embodiment, elements similar to those in the second embodiment of FIGS. 12 to 16 are indicated by the same reference numerals, respectively, and their explanations will be simplified. A difference between the third embodiment and the second embodiment resides in that the linking mechanism 30 is arranged over the supplementary plate 17 and a potentiometer (sensor) 5 detects a pivot angle of the linking member 33.

According to the embodiment, the linking member 33 has a substantial L-shaped cross section so as to follow to the side face 12c and the upper face 12b of the upper vessel 11. Similarly, a recess 12d is formed on the upper face 12b to accommodate the linking member 33 therein. The potentiometer 5 is arranged on the side face 12c of the upper vessel 12 to detect the pivot angle of the linking member 33. In the embodiment, both of the potentiometer 5 and the linking member 30 constitute level detecting means 2 of the invention.

Figure 17:
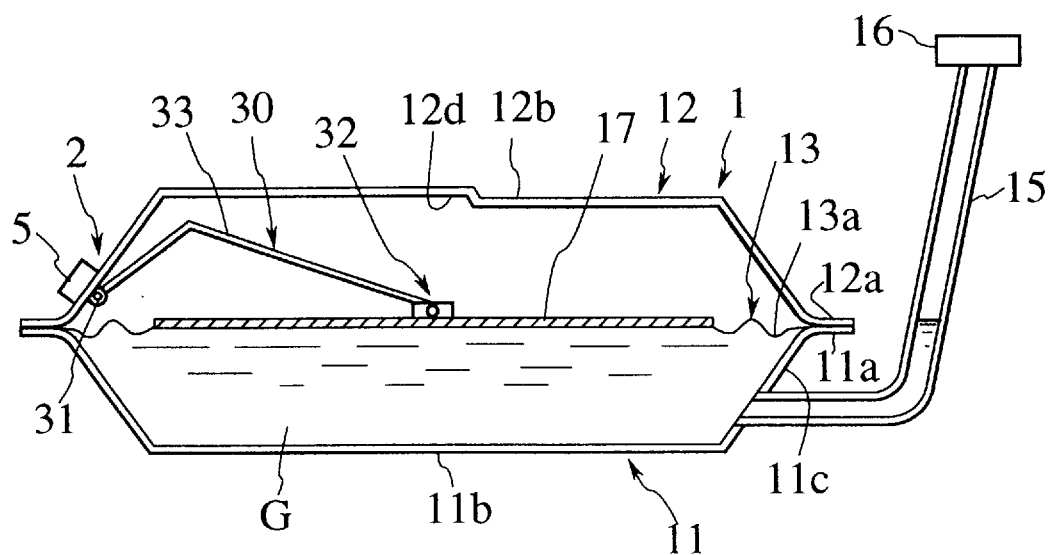
FIG. 17 is a cross sectional view of the fuel tank in accordance with a third embodiment of the present invention.
Figure 18:
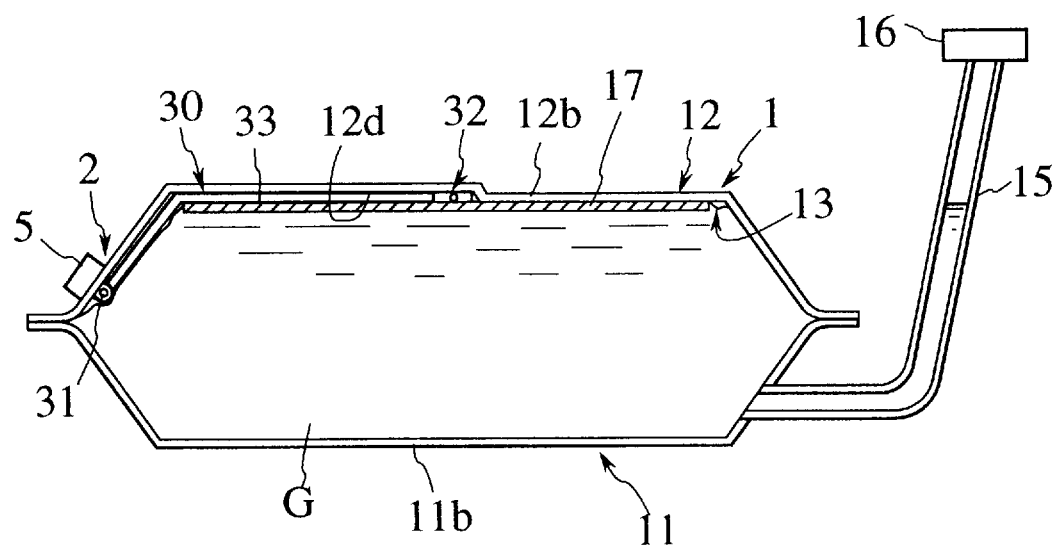
FIG. 18 is a cross sectional view of the fuel tank of FIG. 17, showing an operative condition thereof.
Figure 19:
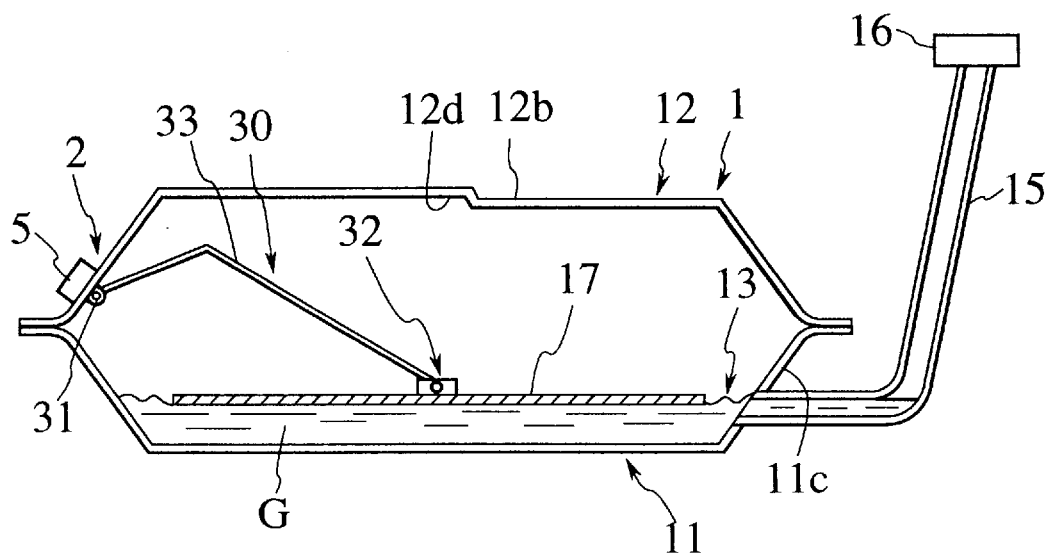
FIG. 19 is a cross sectional view of the fuel tank of FIG. 17, showing another operative condition.

With the so-constructed fuel tank, as shown in FIGS. 17 to 19, the supplementary plate 17 moves up and down in response to the amounts of the gasoline G, while the linking member 33 rotates about the pivot 31 as a fulcrum. During the rotation, owing to the linking member 33, the supplementary plate 17 is usually maintained at the center of the tank body 1 in the horizontal direction. Simultaneously, the position of the plate 17 in the vertical direction is detected by the potentiometer 5 through the pivot angle of the linking member 33. Moreover, since the linking member 33 usually carries the center portion of the supplementary plate 17, the pivot angle of the linking member 33 almost never changes even if the plate 17 is slanted. Accordingly, it is possible to detect the residual amounts of the gasoline G more precisely. Furthermore, it is possible to make use of the linking mechanism 30 as an element of the level detecting member 2.

Figure 20:
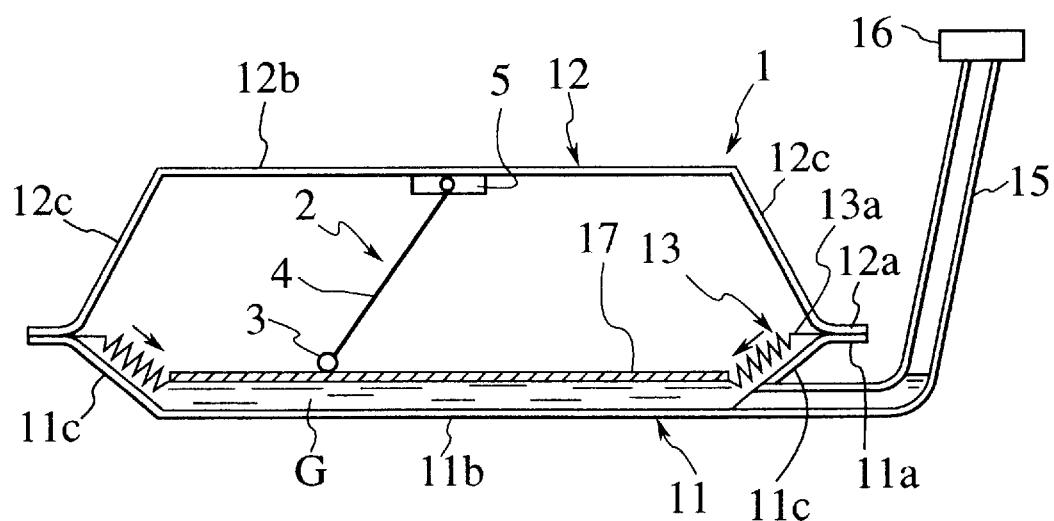
FIG. 20 is a cross sectional view of the fuel tank in accordance with a fourth embodiment of the present invention.
Figure 21:
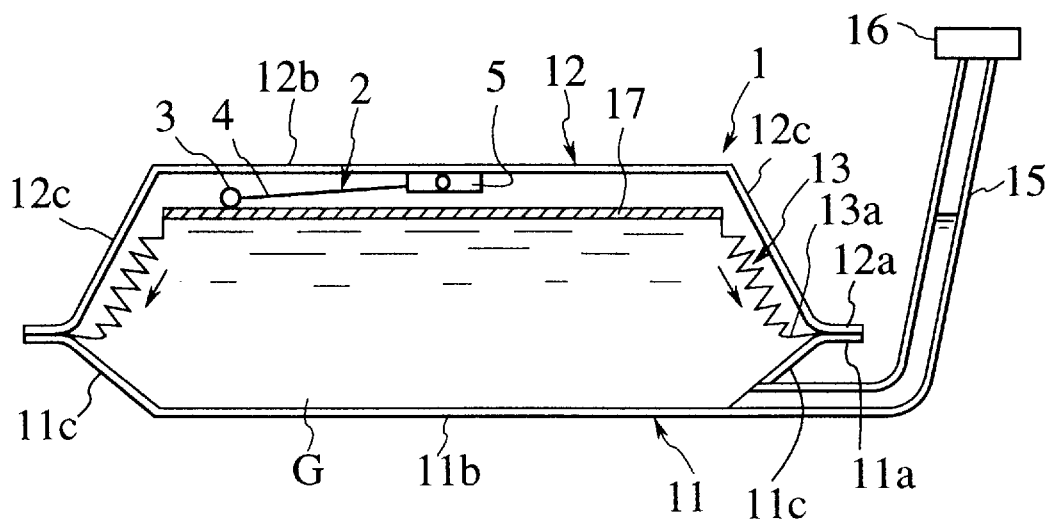
FIG. 21 is a cross sectional view of the fuel tank of FIG. 20, showing an operative condition thereof.

The fourth embodiment of the invention will be described with reference to FIGS. 20 and 21. Note, in this embodiment, elements similar to those in the second embodiment of FIGS. 1 to 11 are indicated by the same reference numerals, respectively, and their explanation will be simplified. Differences between the fourth embodiment and the first embodiment reside in that the flanges 11a, 12a are positioned underside of the center and that the partition film 13 is constructed to have an elastic force.

In detail, the flanges 11a, 12a are positioned at the level of about one third of a height of the tank body 1. The bottom face 11b is formed of such a size substantially equal to that of the upper face 12b.

The partition film 13 is arranged in the tank body 1 so as to cover the surface of the gasoline G spreading between a periphery of the supplementary plate 17 and the inner face of the tank body 1. As shown in FIG. 20, when the supplementary plate 17 is under the flanges 11a, 12a, the partition film 13 in the form of bellows urges the plate 17 on the surface of the gasoline G with the compressive elastic force. On the contrary, when the supplementary plate 17 is above the flanges 11a, 12a, the partition film 13 urges the plate 17 on the surface of the gasoline G with the tensile elastic force. Of course, the periphery 13a of the partition film 13 is secured between the flanges 11a, 12a, as shown in FIG. 4.

In the above-mentioned fuel tank, since the surface of the gasoline G is urged by the elastic force of the film 13 in addition to the weight of the supplementary plate 17, it is possible to restrict the inclination of the surface of the gasoline G forcibly, even though the vehicle travels on the slope causing such an inclination. Accordingly, the elastic force enables the residual amounts of the gasoline G to be detected more precisely.

Figure 22:
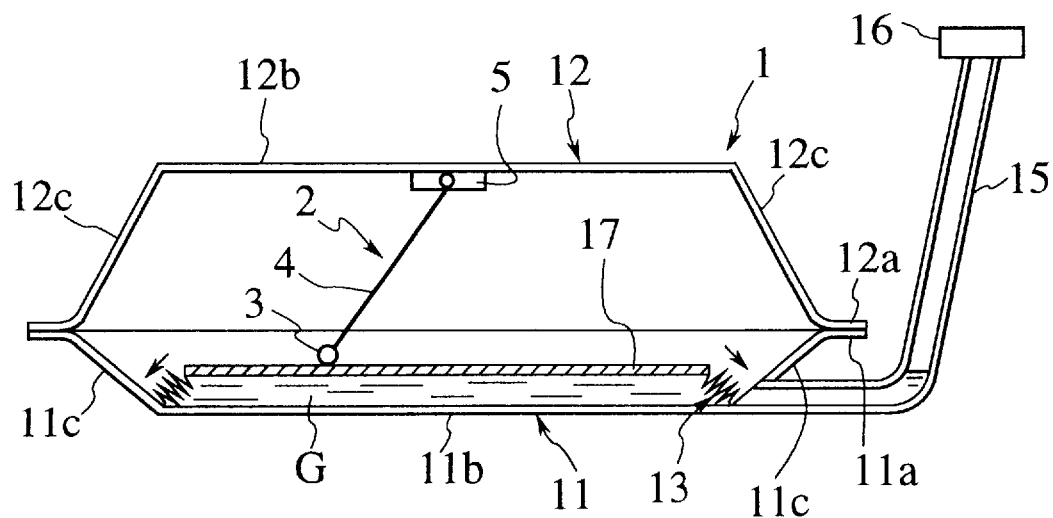
FIG. 22 is a cross sectional view of the fuel tank in accordance with a fifth embodiment of the present invention.

We now describe the fifth embodiment of the invention with reference to FIG. 22. Note, also in this embodiment, elements similar to those in the fourth embodiment of FIGS. 20 and 21 are indicated by the same reference numerals, respectively, and their explanations will be simplified. A difference between the fifth embodiment and the fourth embodiment resides in that the partition film 13 connects a periphery of the bottom face 11a to the periphery of the supplementary plate 17.

In detail, as shown in FIG. 22, the partition film 13 is constructed so as to usually depress the plate 17 on the surface of the gasoline G with the tensile elastic force. Therefore, the fuel tank of the embodiment operates in the same way as the fuel tank in the fourth embodiment.

Figure 23:
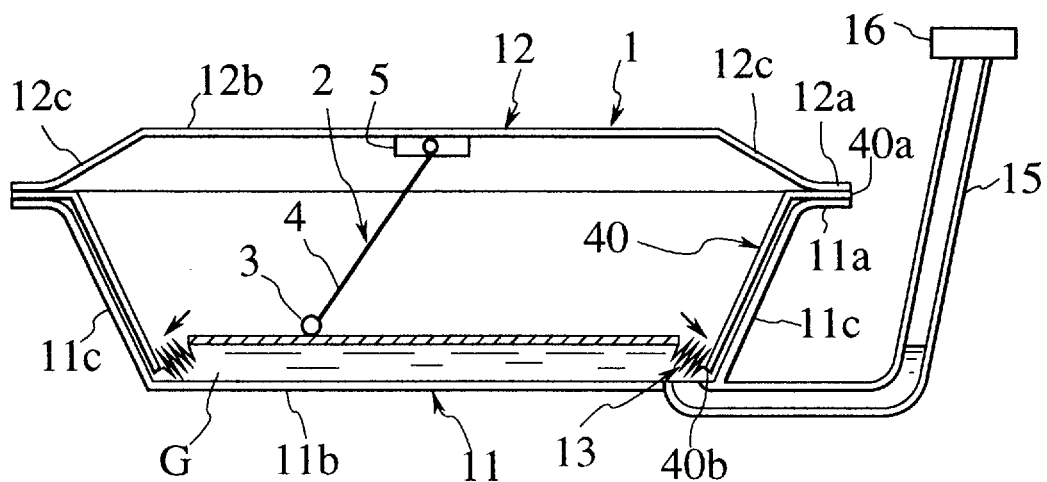
FIG. 23 is a cross sectional view of the fuel tank in accordance with a sixth embodiment of the present invention.

Next, the sixth embodiment of the invention will be described with reference to FIG. 23. In this embodiment, elements similar to those in the fourth embodiment of FIGS. 20 and 21 are indicated by the same reference numerals, respectively, and their explanations will be simplified. Differences between the sixth embodiment and the fourth embodiment reside in that the flanges 11a, 12a are positioned on the upper side of the center of the tank body 1 and that the partition film 13 is fixed to the tank body 1 through the intermediary of a resin stay 40.

In detail, the flanges 11a, 12a are positioned at the level of about three fourths of the whole height of the tank body 1. The bottom face 11b is formed of such a size substantially equal to that of the upper face 12b.

The resin stay 40 is formed to have a substantial L-shaped cross section, having its periphery 40a interposed between the flanges 11a, 12a. The resin stay 40 has a lower end 40b which is arranged close to the periphery of the bottom face 11b and to which the partition film 13 is secured.

In the above-mentioned fuel tank, the supplementary plate 17 is urged against the surface of the gasoline G by the tensile force of the partition film 13. Therefore, the operations and effects are similar to those in the fourth and fifth embodiments. Further, owing to a provision of the resin stay 40, the flanges 11a, 12a can be arranged on an upper side of the tank body 1. Thus, it is possible to prevent the gasoline G from leaking out of the tank body 1 through the flanges 11a, 12a as a join.

Figure 24:
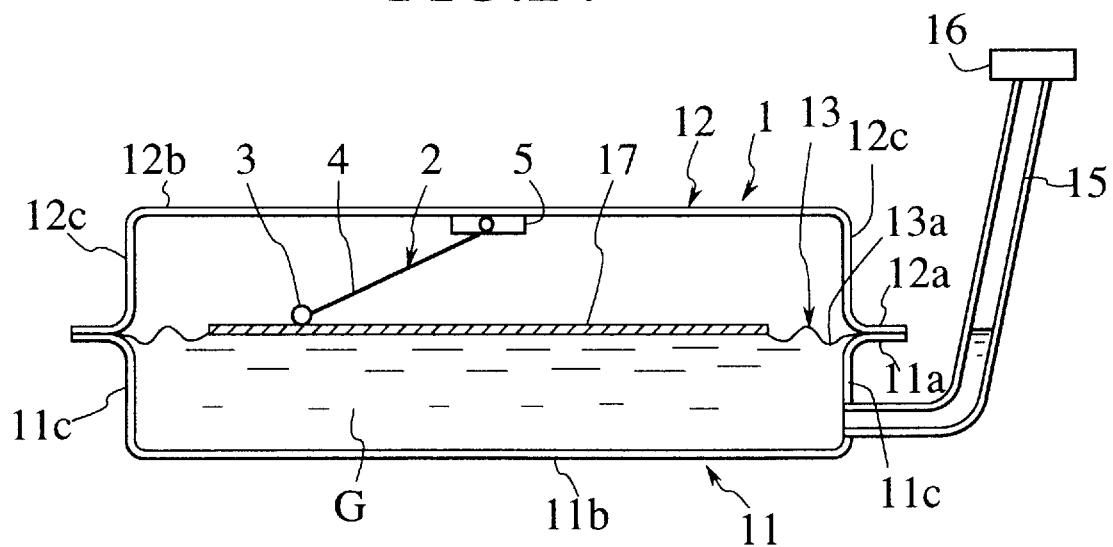
FIG. 24 is a cross sectional view of the fuel tank in accordance with a seventh embodiment of the present invention.
Figure 25:
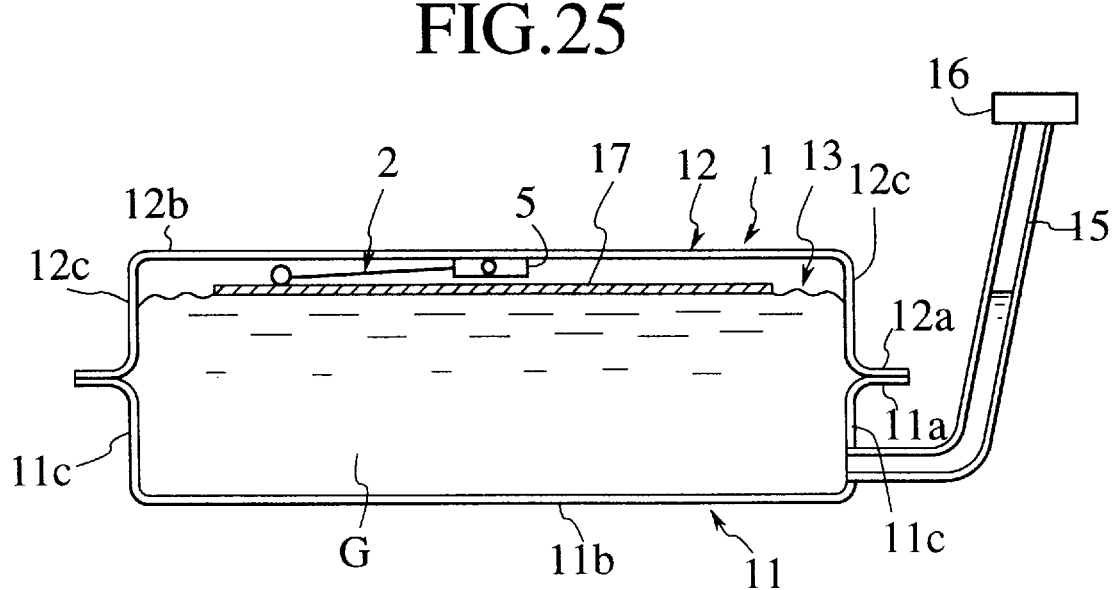
FIG. 25 is a cross sectional view of the fuel tank of FIG. 24, showing an operative condition thereof.
Figure 26:
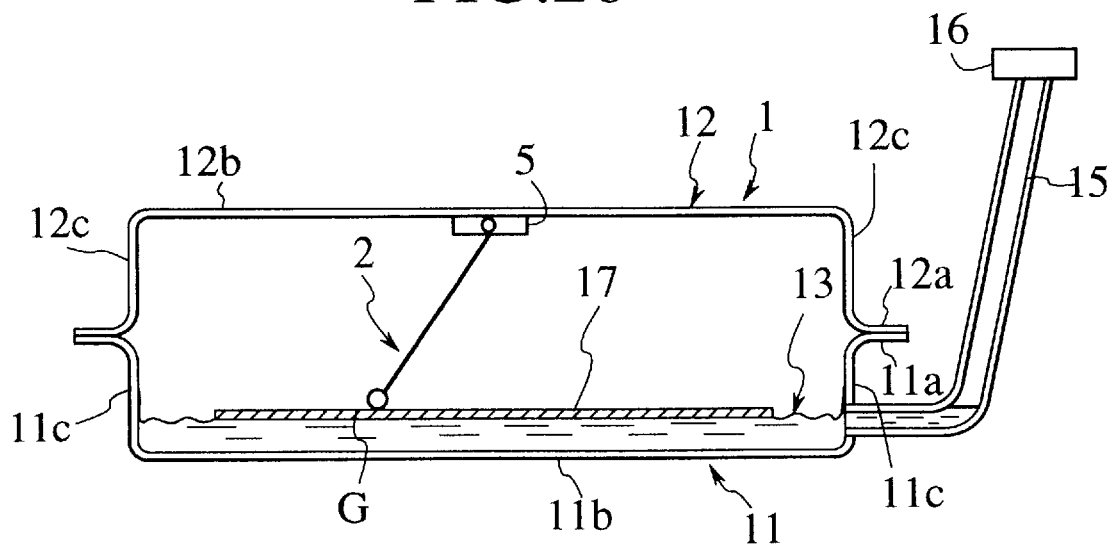
FIG. 26 is a cross sectional view of the fuel tank of FIG. 24, showing another operative condition thereof.
Figure 27:
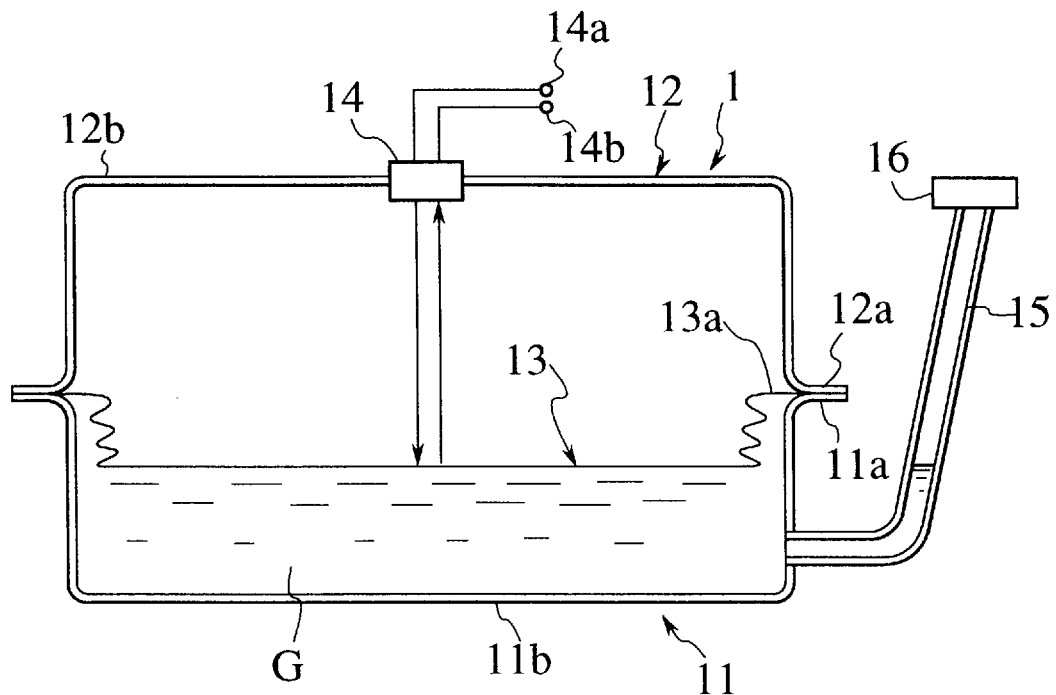
FIG. 27 is a cross sectional view of the fuel tank in accordance with an eighth embodiment of the present invention.
Figure 28:
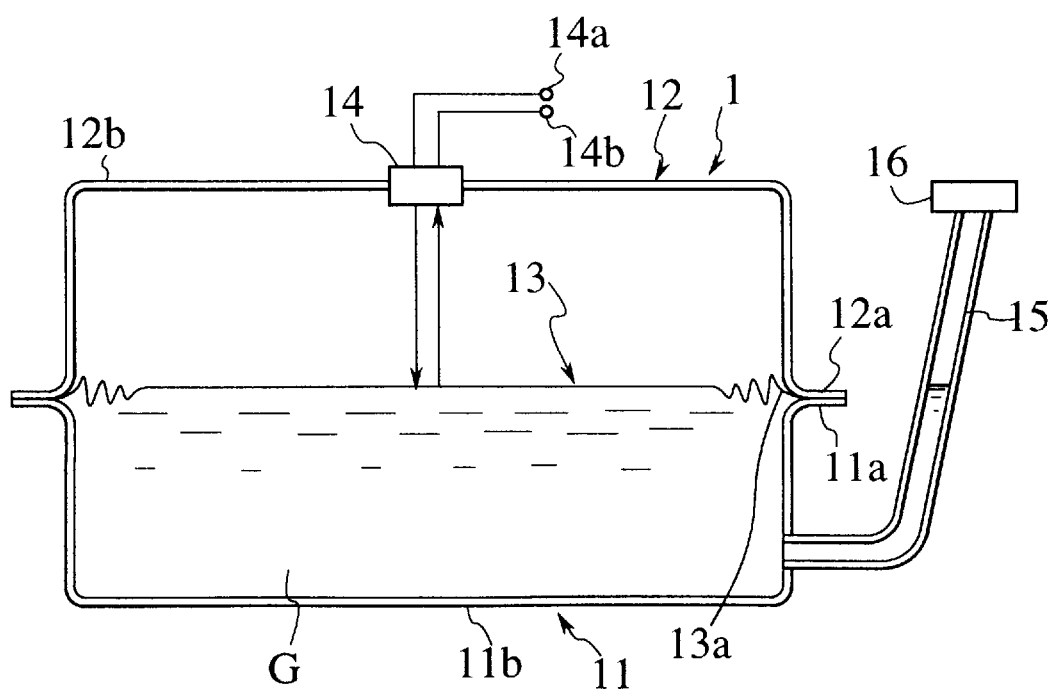
FIG. 28 is a cross sectional view of the fuel tank of FIG. 27, showing the operation.
Figure 29:
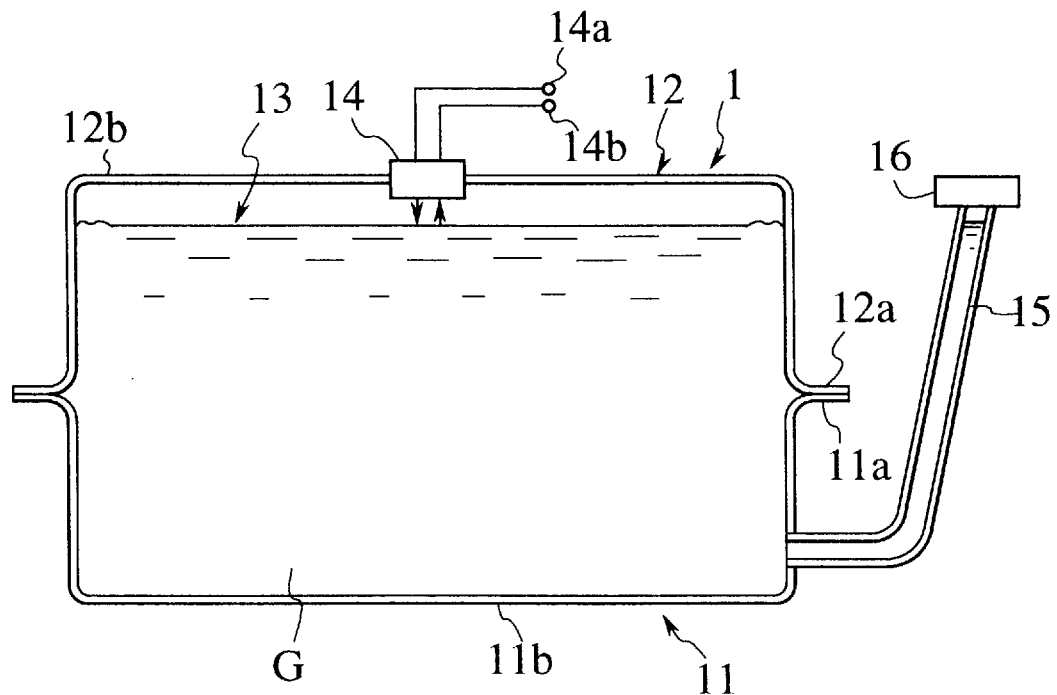
FIG. 29 is a cross sectional view of the fuel tank of FIG. 27, showing the operation.
Figure 30:
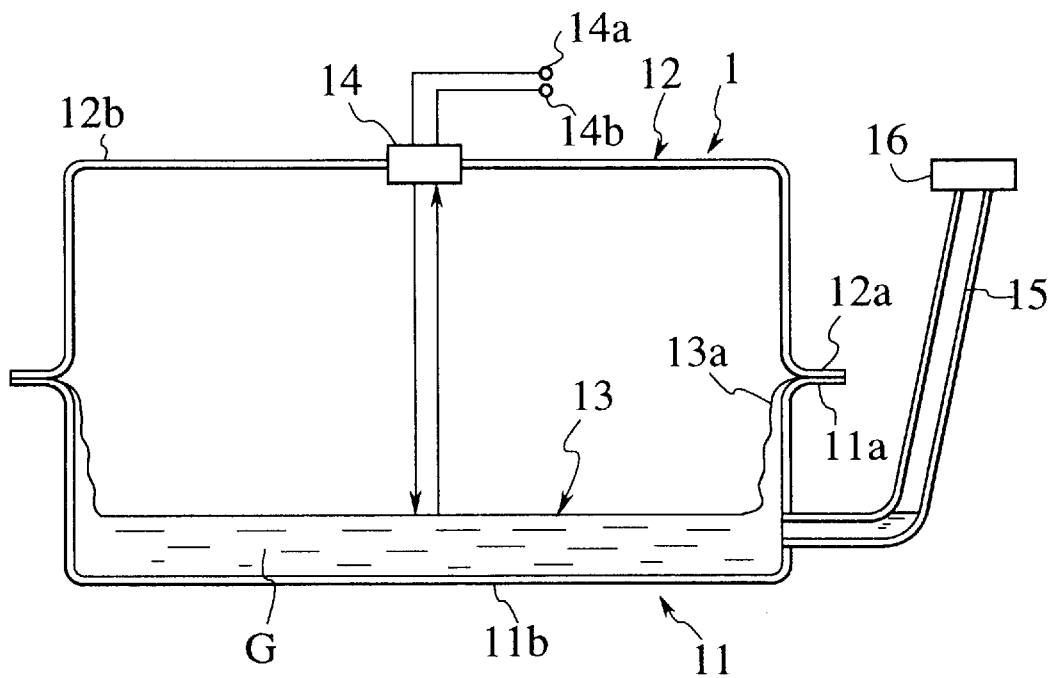
FIG. 30 is a cross sectional view of the fuel tank of FIG. 27, showing the operation.
Figure 31:
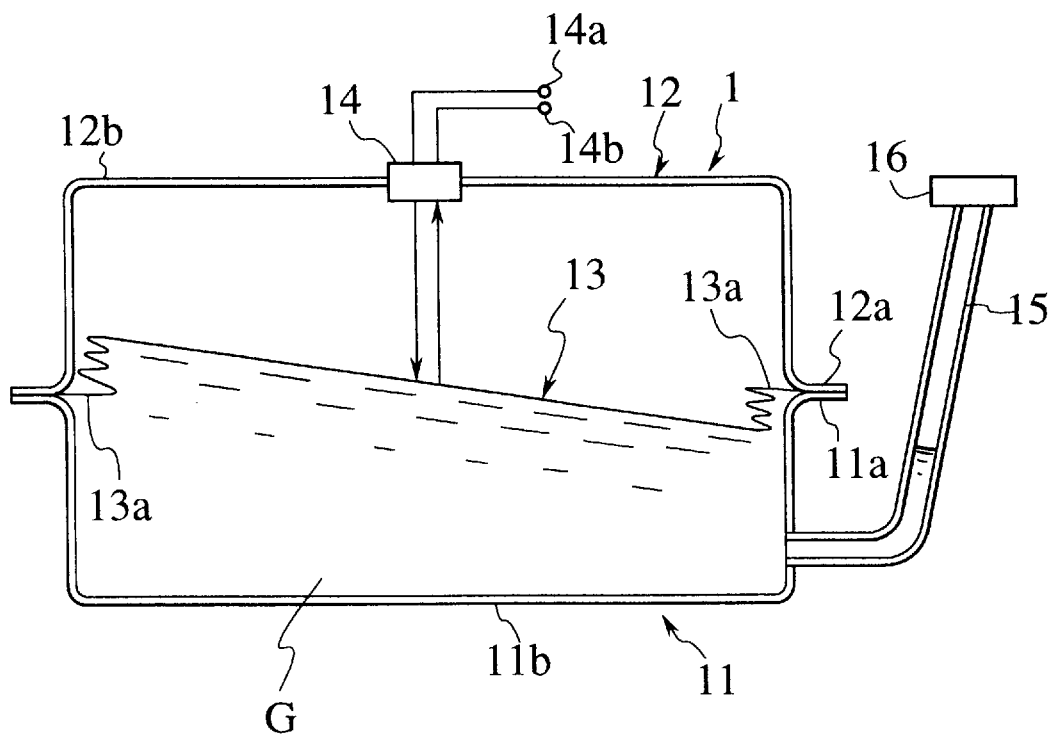
FIG. 31 is a cross sectional view of the fuel tank of FIG. 27, showing the operation.
Figure 32:
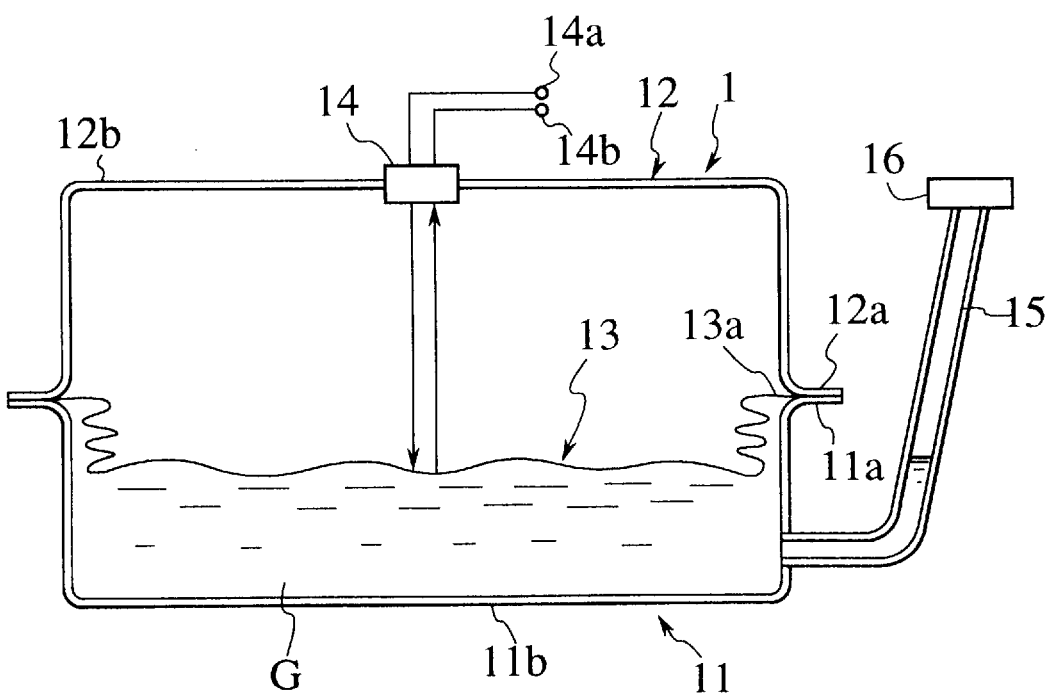
FIG. 32 is a cross sectional view of the fuel tank of FIG. 27, showing the operation.

Then, the seventh embodiment of the invention will be described with reference to FIGS. 24 to 26. In this embodiment, elements similar to those in the first embodiment of FIGS. 1 to 11 are indicated by the same reference numerals, respectively, and their explanations will be simplified. A difference between the seventh embodiment and the first embodiment is the only fact that the tank body 1 has a rectangular cross section.

Thus, the lower vessel 11 has the side face 11c standing perpendicular to the bottom face 11b while the upper vessel 12 has the side face 12c extending perpendicular to the upper face 12b. The operations and effects are similar to those of the first embodiment.

Next, referring to FIGS. 27 to 32, we describe the eighth embodiment of the invention. It is noted that in this embodiment, elements similar to those in the seventh embodiment of FIGS. 24 to 26 are indicated by the same reference numerals, respectively, and their explanations will be eliminated. The eighth embodiment differs from the seventh embodiment in respects that the supplementary plate 17 is eliminated, while an ultrasonic level sensor 14 is replaced with the level detecting means 2.

In detail, the surface of the gasoline G is covered with the partition film 13 only. The ultrasonic level sensor 14 is mounted on the upper face 12a at the center.

In operation, the ultrasonic level sensor 14 generates ultrasonic waves right under and then receives the waves reflected by the partition film 13 to detect a position of the surface. That is, the ultrasonic level sensor 14 detects the position of surface of the partition film 13, the surface corresponding to a center of the tank body 1 in the horizontal direction. The sensor 14 is connected to a fuel indicator which is not shown in the figure, through terminals 14a, 14b.

In the fuel tank mentioned above, the residual amounts of the gasoline G shown in FIGS. 27 to 30 are detected by the ultrasonic level sensor 14. In case that the vehicle is either parked on the slope or accelerated, the partition film 13 is slanted following to the slanted surface of the gasoline G. Nevertheless, since the sensor 14 is positioned at the center of the tank body 1 in the horizontal direction, there is hardly any difference between a measured value before slanting and that after slanting. Thus, even if the partition film 13 is inclined, it is possible to detect the residual amounts of the gasoline G precisely.

Figure 33:
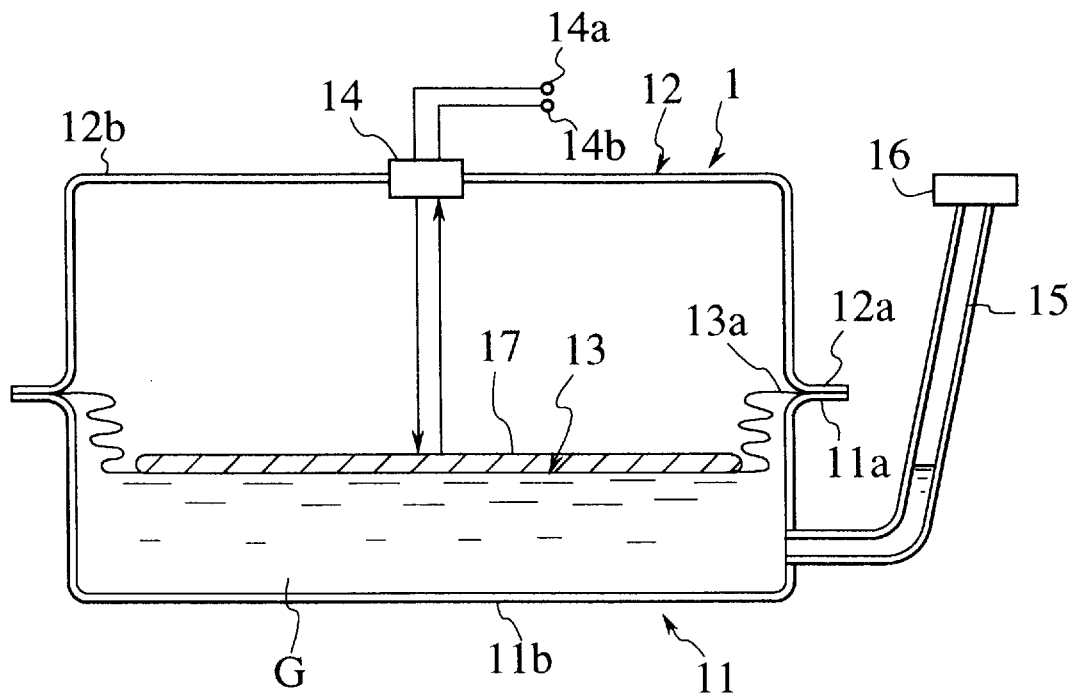
FIG. 33 is a cross sectional view of the fuel tank in accordance with a ninth embodiment of the present invention.
Figure 34:
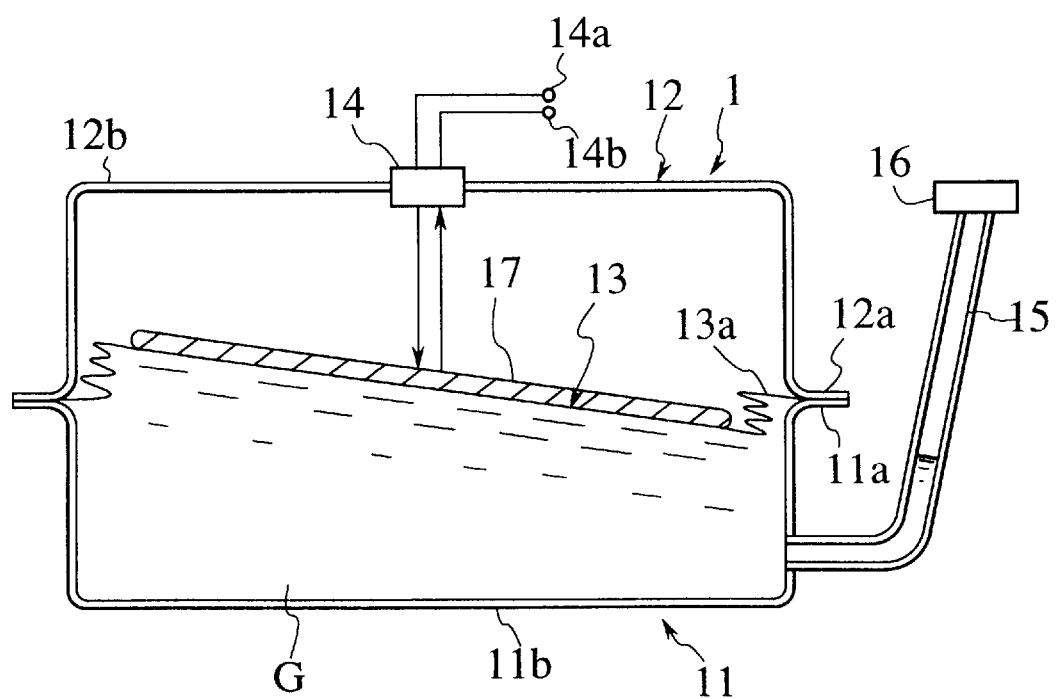
FIG. 34 is a cross sectional view of the fuel tank of FIG. 33, showing an operative condition thereof.

Next, referring to FIG. 33 and FIG. 34, we describe the ninth embodiment of the invention. It is noted that in this embodiment, elements similar to those in the eighth embodiment of FIGS. 27 to 32 are indicated by the same reference numerals, respectively, and their explanations will be eliminated. The ninth embodiment differs from the eighth embodiment in a respect that the supplementary plate 17 is mounted on the partition film 13.

Therefore, the functions and effects of the fuel tank in accordance with the ninth embodiment are similar to those of the above-mentioned first embodiment, in addition to the functions and effects of the eighth embodiment.

Figure 35:
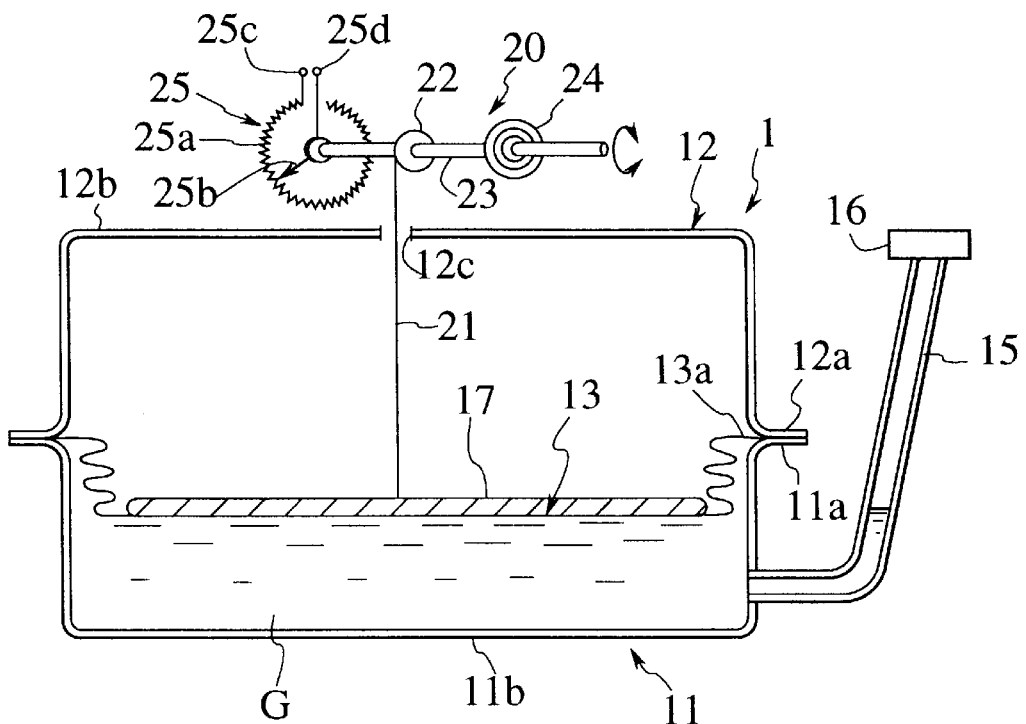
FIG. 35 is a cross sectional view of the fuel tank in accordance with a tenth embodiment of the present invention.

The tenth embodiment of the invention will now be described with reference to FIG. 35 and FIG. 36. In this embodiment, elements similar to those in the first embodiment of FIGS. 33 and 34 are indicated by the same reference numerals, respectively, and their explanations will be simplified. A difference between the tenth embodiment and the ninth embodiment resides in that the level detecting means 20 is replaced with the ultrasonic level sensor 13.

The level detecting means 20 includes a flexible cable 21, a pulley 22 for winding the cable 21, a drive shaft 23 for rotating the pulley 22, a coil spring 24 for exerting rotating force on the shaft 23, and a potentiometer 25 for converting a rotational position of the shaft 23 into an electrical signal.

Hanging from a through hole 12c formed at the center of the upper face 12b of the upper vessel 12 downwardly, the cable 21 has one end fixed to the supplementary plate 17. Thus, the end of the cable 21 is connected to the upper part of the supplementary plate 17, which corresponds to the center of the tank body 1 in the horizontal direction. While, the other end of the cable 21 is wound about the pulley 22.

Although the plate 17 cannot be lifted up by the repulsive force of the coil spring 24, it exerts a force enough to rotate the potentiometer 22 on the drive shaft 23. Further, owing to the coil spring 24, the tension is usually applied on the cable 21. The potentiometer 25 includes a card 25a constituted by a resistance line, and a brush 25b abutting on the card 25a in a position varying corresponding to the rotational position of the drive shaft 23. That is, the potentiometer 25 serves to convert the rotational position of the drive shaft 23 into a voltage signal and generates it, having terminals 25c, 25d connected to the not-shown fuel indicator.

In operation, corresponding to the position of the supplementary plate 17 in the up and down direction, the cable 21 is wound in the pulley 22 or wound out from the pulley 22. Thus, the up and down position of the plate 17 can be detected by the potentiometer 25 through the cable 21 and the pulley 22.

Figure 36:
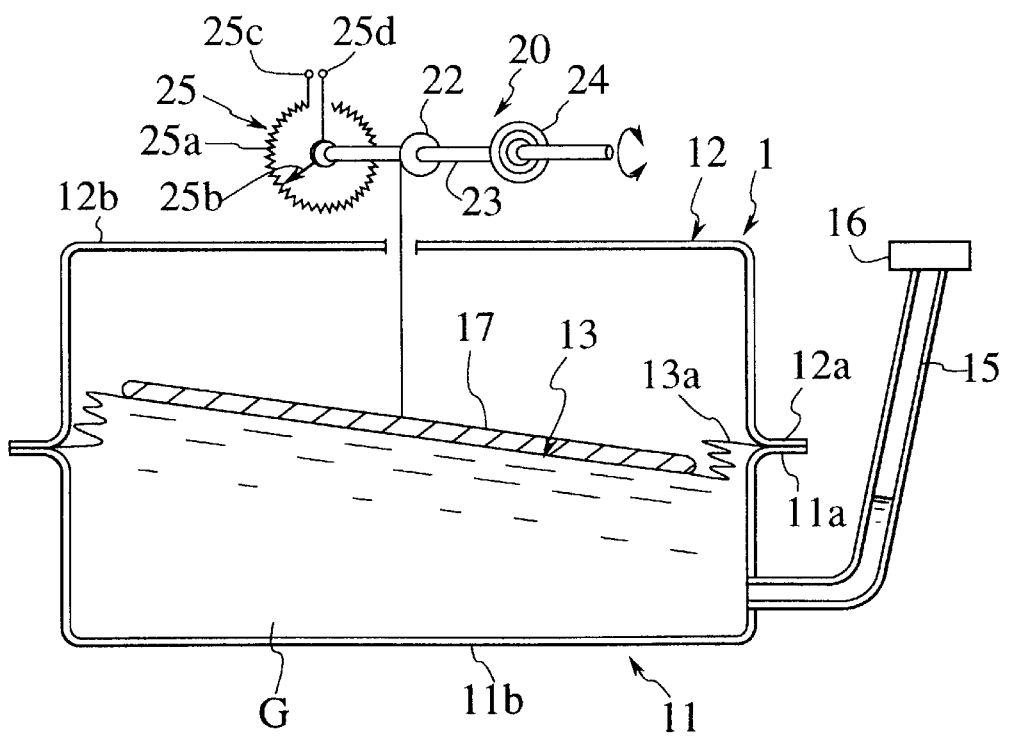
FIG. 36 is a cross sectional view of the fuel tank of FIG. 35, showing an operative condition thereof.

According to the embodiment, since the cable 21 is fastened to the upper face of the plate 21 corresponding to the center of the tank body 1 in the horizontal direction, even if the plate 17 is brought into slanting condition as shown in FIG. 36, there would be no changes in position for detecting the supplementary plate 17. That is, in even a case that the partition film 13 inclines, it is possible to exclude errors in detecting the residual amounts of the gasoline G.

As mentioned above, since the gasoline G is covered with the partition film 13 in common with the respective embodiments, it is possible to prevent the vaporization of gasoline and it is remarkably convenient to measure the position of the surface of the gasoline G. Accordingly, it is a matter of course that the fuel tank of the invention is capable of measuring the surface of the gasoline G by using the above-mentioned level detecting means 2, the combination of the potentiometer 5 and the linking mechanism 30, the ultrasonic level sensor 14 and the level detecting means 20. Further, instead of the potentiometer 5 of the embodiment, it may be applicable of any one of the present detectors (ex. Hall-element and magnet, lead-switch and magnet, photo sensor etc.) as a method of detecting the rotating object.

If it is required to calculate the residual amounts of the gasoline G in the digital form of the above method, pulse counts corresponding to "empty" and "full-charge" of the gasoline G (ex. empty: 0, full: 300 cts.) are previously stored in storing means, such as non-volatile memory, so that the actual residual amounts can be calculated by the present pulse counts detected actually.

Although the above-mentioned embodiments of the present invention refer to the fuel tank for the automobile, the invention may be applied to the fuel tank in a construction machine, such as a powered shovel etc. or another machine. Further, the invention is also applicable to a tank for reserving the other liquid, of course.

Finally, it will be understood by those skilled in the art that the foregoing description is one of preferred embodiments of the disclosed liquid tank, and that various changes and modifications may be made to the present invention without departing from the spirit and scope thereof.

What is claimed is:

1. A liquid tank comprising:
   a tank body which forms a reservoir for a liquid;
   a flexible partition film arranged in said tank body to divide a space therein into vertical spaces and positioned so as to cover a surface of the liquid; and
   level detecting means for detecting a position of said flexible partition film, wherein said flexible partition film comprises a textile material of fabric and a sealing member fitted on at least one of both surfaces of said textile material to exhibit sealability and flexibility.

2. A liquid tank as claimed in claim 1, wherein said level detecting means detects a position of a portion of said flexible partition film, said portion being positioned corresponding to a center portion of said tank body in a horizontal direction.

3. A liquid tank as claimed in claim 1, wherein said flexible partition film is provided on a top face thereof with a supplementary plate in the form of a flat plate and wherein said level detecting means detects a position of a top face of said supplementary plate.

4. A liquid tank as claimed in claim 1, which comprises a pair of upper and lower supplementary plates in the form of flat plates, wherein said level detecting means detects a position of a top face of said upper supplementary plate.

5. A liquid tank as claimed in claim 3, wherein said flexible partition film is made of material having an elastic force to urge said supplementary plate in a direction toward the surface of the liquid.

6. A liquid tank as claimed in claim 5, wherein said level detecting means detects a position of a portion of said supplementary plate, said portion being positioned corresponding to a center potion of said tank body in the horizontal direction.

7. A liquid tank as claimed in claim 6, further comprising a linking mechanism contacting said supplementary plate so that a center portion of said supplementary plate is adjusted to said center of said tank body in the horizontal direction, while carrying said supplementary plate so as to move up and down.

8. A liquid tank as claimed in claim 7, wherein said linking mechanism includes a linking member and wherein said level detecting means comprises a sensor for detecting a pivot angle of said link member of said linking mechanism.

9. A liquid tank as claimed in claim 3, wherein said supplementary plate comprises a thickened part of said sealing member.

10. A liquid tank as claimed in claim 3, wherein said supplementary plate comprises a flat part of said flexible partition film and a flat plate embedded in said sealing member.

11. A liquid tank comprising:
a tank body which forms a reservoir for a liquid;
a supplementary plate arranged in said tank body so as to be in tight contact with a surface of the liquid;
a flexible partition film arranged in said tank body so as to cover the remaining surface of the liquid spreading between a periphery of said supplementary plate and an inner wall of said tank body; and
level detecting means for detecting a position of an upper face of said supplementary plate.

12. A liquid tank, comprising:
a tank body which forms a reservoir for a liquid;
a flexible partition film arranged in said tank body to divide a space therein into vertical spaces and positioned so as to cover a surface of a liquid; and
a level detecting mechanism detecting a portion of said partition film wherein said flexible partition film comprises a textile material made of fabric and a sealing member fitted on at least one of both surfaces of said textile material to exhibit sealability and flexibility.

13. A liquid tank as claimed in claim 12, wherein said level detecting mechanism detects a position of a portion of said flexible partition film, said portion being positioned corresponding to a center portion of said tank in a horizontal direction.

14. A liquid tank as claimed in claim 12, wherein said flexible partition film is provided on a top face thereof with a supplementary plate in the form of a flat plate and wherein said level detecting mechanism detects a position of a top face of said supplementary plate.

15. A liquid tank as claimed in claim 12, which comprises a pair of upper and lower supplementary plates in the form of flat plates, wherein said level detecting mechanism detects a position of a top face of said upper supplementary plate.

16. A liquid tank as claimed in claim 14, wherein said flexible partition film is made of a material having elastic force to urge said supplementary plate against the surface of the liquid.

17. A liquid tank as claimed in claim 16, wherein said level detecting mechanism detects a position of a portion of said supplementary plate, said portion being positioned corresponding to a center portion of said tank body in the horizontal direction.

18. A liquid tank as claimed in claim 14, wherein said supplementary plate comprises a thickened part of said sealing member.

19. A liquid tank as claimed in claim 14, wherein said supplementary plate comprises a flat part of said flexible partition film and a flat plate embedded in said sealing member.

20. A liquid tank as claimed in claim 17, further comprising a linking mechanism contacting said supplementary plate so that a center portion of said supplementary plate is adjusted to said center of said tank body in the horizontal direction, while carrying said supplementary plate so as to move up and down.

21. A liquid tank as claimed in claim 20, wherein said linking mechanism includes a linking member and said level detecting mechanism comprises a sensor detecting a pivot angle of said link member of said linking mechanism.

22. A liquid tank, comprising:
a tank body which forms a reservoir for a liquid;
a supplementary plate arranged in sand tank body so as to be in tight contact with the surface of the liquid;
a flexible partition film arranged in said tank body so as to cover the remaining surface of the liquid spreading between a periphery of said supplementary plate and an inner wall of said tank body; and
a level detecting mechanism detecting a position of an upper face of said supplementary plate.

* * * * *